July 19, 1960 R. B. MATTHEWS 2,945,502
FLOW CONTROL DEVICES
Filed Oct. 4, 1955 2 Sheets-Sheet 1

INVENTOR.
Russell B. Matthews
BY
Seegert & Schwalbach
Attys

July 19, 1960

R. B. MATTHEWS 2,945,502

FLOW CONTROL DEVICES

Filed Oct. 4, 1955

INVENTOR.
Russell B. Matthews
BY
Seegert & Schwalbach
Attorneys 2,945,502
Patented July 19, 1960

2,945,502
FLOW CONTROL DEVICES

Russell B. Matthews, Wauwatosa, Wis., assignor to Baso Inc., a corporation of Wisconsin.

Filed Oct. 4, 1955, Ser. No. 538,350

8 Claims. (Cl. 137—66)

The present invention pertains to fluid flow control devices, and more particularly to those devices for controlling, in a certain manner, the fluid flow through several independent passages. More specifically, the present invention pertains to control devices for fluid fuel burning apparatus wherein an ignition burner and a main burner are to be afforded fuel flow in a predetermined sequence to provide certain desirable, if not necessary, safety features, and wherein the fuel supply passages for said burners are separated from and are independent of each other.

One of the main objects of the present invention is to provide in a control device of the class described, a single actuating means for controlling a plurality of flow control members, which actuating means is sequentially movable in several directions to afford operational movement of said flow control members in a predetermined sequence.

Another object is to provide in a control device, electromagnetic safety shut-off means for controlling separate valve members positioned in separated fluid passages, said safety shut-off means having an electromagnet and an armature therefor associated with said valve members to provide termination of fuel flow through both of said passages upon deenergization of said electromagnet.

Another object of the present invention is to provide a control device having a rotatable plug valve and a resettable safety shut-off valve in a main fuel passage and having a flow control valve in a pilot fuel passage, which safety shut-off valve and flow control valve are interconnected by lever means actuatable by a reset stem reciprocatably mounted in the plug valve to provide simultaneous resetting of said safety shut-off and flow control valves but only when said plug valve is in its main fuel flow-preventing position.

Another object is to provide in a control device of the class described a resettable safety shut-off valve in each of several separated fluid passages, a rotatable plug valve in one of said passages, operating means for rotation of said plug valve and resetting of said safety shut-off valves, and abutment means for preventing resetting of said safety shut-off valves unless said plug valve is in its flow-preventing position.

Another object is to provide control device of the character described wherein the plug valve is movable by the valve operating means between several flow-controlling positions independent of said safety shut-off valves.

Another, more specific, object is to provide in a control device of the character described, wherein means is provided for terminating, as desired, fuel flow through one of the two separated fuel passages and to thereby terminate fuel flow through both of said passages by returning both of the safety shut-off valves to their flow-preventing positions.

Another specific object of the present invention is to provide a control device of the character described having its various parts so arranged as to provide a small compact unit to permit installation thereof in a confined area adjacent a fuel burning apparatus.

Another specific object is to provide a control device of the class described capable of providing the aforementioned various control functions and which is simple to operate and easy to disassemble and repair.

Further objects and advantages and numerous adaptations of the present invention will appear from the following detailed description taken in connection with the accompanying drawings showing several embodiments of the invention, it being understood that the invention is limited only by the scope of the appended claims and not by the particular embodiments selected for illustration.

In the drawings.

Like reference characters indicate corersponding parts throughout the several views of the drawings.

Figure 1:
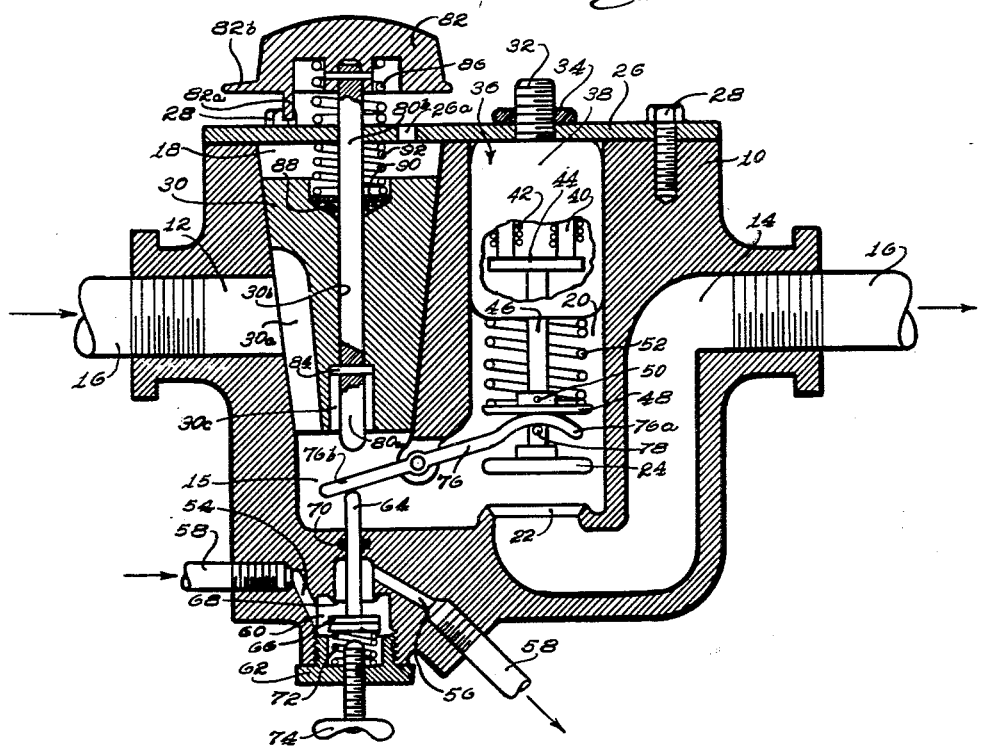
Figure 1 is a fragmentary sectional view of the first embodiment of the present invention.

Referring to Figure 1, numeral 10 designates a valve body formed with a main inlet chamber 12, a main outlet chamber 14 and an intermediate chamber 15. Each of chambers 12 and 14 is formed with internal threads for connection with contiguous sections of a main fuel supply conduit 16, the latter being connected to a source of fluid fuel supply and to a main fuel burner (not shown). Valve body 10 is further formed with a tapered cavity 18 and a cylindrical cavity 20. A valve seat 22, formed in valve body 10, cooperates with a valve member 24 to control communication between intermediate chamber 15 and outlet chamber 14 as will hereinafter be explained.

Positioned within tapered cavity 18 is a plug valve 30 having a frusto-conical shape, the peripheral surface of which is substantially complemental with respect to the tapered surface of cavity 18. Plug valve 30 is formed with a port 30a for registration with inlet chamber 12 to afford control of fluid flow between inlet chamber 12 and intermediate chamber 15.

A cover plate 26 is secured to valve body 10 by means such as bolts 28 to enclose cavities 18 and 20 and to afford mounting means for various control elements as will become more apparent as the description proceeds. Fixed to cover plate 26, as by means of a terminal socket 32 and nut 34, and positioned within cavity 20 as shown in Figure 1, is an electromagnetic holding device 36. Holding device 36 is commonly referred to in the art as a hood assembly and comprises an enclosure 38 within which is secured, by any well known means (not shown), a U-shaped electromagnet core member 40. Wound about the legs of core member 40 is an electromagnet winding 42 having lead connections (not shown) extending to the terminal socket 32 to afford connection between winding 42 and the lead of a thermoelectric generator (also not shown) in a manner well known in the art.

Disposed within enclosure 38 for cooperation with stationary core member 40, is a movable armature member 44 having affixed thereto a valve stem 46 which slidably extends through a suitable opening therefor in an end wall of enclosure 38 and carries the valve member 24 movable from one to another flow-controlling position with respect to the valve seat 22 for control of fuel flow past said seat. I prefer to employ a pivotal connection (not shown) between stem 46 and valve member 24 to permit valve member 24 to seat firmly about the periphery of valve seat 22. A spring retainer 48 is secured to stem 46 intermediate the ends thereof by any well known means such as pin 50. Interposed between retainer 48 and the adjacent end wall of enclosure 38 is a compression spring 52 for biasing the valve member 24 toward the valve seat 22.

Valve body 10 is further formed with a pilot fuel inlet chamber 54 and a pilot fuel outlet chamber 56 each of which is formed with means, such as internal threads, for securely retaining contiguous sections of a pilot fuel supply conduit 58. Said conduit 58 is connected to a source of fluid fuel and to a pilot burner (not shown) positioned adjacent to the aforementioned main burner. A pilot fuel valve chamber 60 formed in valve body 10 affords communication between inlet chamber 54 and outlet chamber 56 and is formed with threads for receiving an enclosing nut 62. Valve body 10 is further formed with an opening extending between pilot valve chamber 60 and intermediate chamber 15 within which a pilot valve stem 64 is slidably positioned. A valve member 66 is fixed to one end of stem 64 for cooperation with a valve seat 68 and is movable from one to another flow controlling position with respect thereto for control of fuel flow through the chamber 60. Interposed between valve member 66 and enclosing nut 62 is a compression spring 72 for biasing the valve member 66 toward seating engagement with valve seat 68. A thumb screw 74 is threaded through the enclosing nut 62 for coaction with the valve member 66 in a manner to afford manual termination of fuel flow to the pilot burner, as will hereinafter be more fully explained. I prefer to employ an O-ring 70 between stem 64 and valve body 10 to prevent fuel flow between chambers 15 and 60.

Pivotally mounted on valve body 10 within the intermediate chamber 15, is an actuating lever 76 having an arcuate end portion 76a positioned between spring retainer 48 and a pin 78 fixed to the valve stem 46. The arcuate shape of the end portion 76a permits pivotal movement of lever 76 in a counterclockwise direction to transmit a substantially linear force to valve stem 46 substantially free of undesirable twisting or bending moments. The other end portion of lever 76, namely end portion 76b, is positioned for engagement with the pilot valve stem 64, as shown in Figure 1, so that counterclockwise movement of lever 76 to the position of Figure 1 will cause disengagement of pilot valve 66 from the valve seat 68.

Plug valve 30 is formed with a longitudinal through opening 30b within which is slidably positioned a reset or actuating stem 80 having an end portion 80a adjacent and cooperable with the end portion 76b of lever 76. The other end portion 80b of stem 80 extends through an opening formed in cover plate 26 and has an operating handle 82 secured thereto. Plug valve 30 is further formed with a slot 30c which intersects opening 30b for receipt of a pin 84 transversely extending through the actuating stem 80. The slot 30c and pin 84 cooperate to prevent rotational movement between plug 30 and reset stem 80, while permitting axial movement therebetween. Interposed between cover plate 26 and operating handle 82 is a compression spring 86 for biasing said handle and the actuating stem 80 axially outwardly to its initial position shown in Figure 1.

I prefer to employ packing means 88 between plug valve 30 and stem 80 to prevent the escape of fluid fuel therebetween. A compression spring 92 having a greater spring force than that of spring 86 is interposed between cover plate 26 and a washer 90, the latter being positioned on the packing means 88 to maintain the same in firm contact with both plug valve 30 and stem 80. Spring 92 also maintains plug valve 30 in firm seating engagement within the tapered cavity 18 of valve body 10.

Operating handle 82 is formed with a projection 82a for registration with an opening 26a formed in cover plate 26 for preventing depression of said handle and resetting of valve members 24 and 66 except when plug valve 30 is in its flow-preventing position.

The operation of the first embodiment of the present invention is as follows:

With valve members 24 and 66 in their flow-preventing positions, the first step in affording ignition of the aforementioned main and pilot burners is to rotate operating handle 82 until extent 82a of handle 82 is in registry with the opening 26a of cover plate 26; such movement of operating handle 82 causing plug valve 30 to be rotated to its flow-preventing position wherein port 30a is out of registration with inlet chamber 12. The operating handle 82 is then depressed to cause end portion 80a of reset stem 80 to contact end portion 76b of lever 76 and to rotate said lever in a counterclockwise direction about its pivotal mounting on valve body 10. Such rotation of lever 76 causes movement of the armature member 44 into engagement with core member 40 and movement of the valve members 24 and 66 to their flow-permitting positions. Such movement of valve member 66 permits fluid fuel to flow to the pilot burner through pilot valve chamber 60 and conduit 58, and the fluid fuel thus emitted from the pilot burner may be ignited in any well known manner. No fuel can flow to the main burner during the resetting operation, however, since the plug valve 30 prevents such flow during this resetting operation.

The pilot burner is so positioned with respect to the thermoelectric generator that the pilot burner flame heats the hot junction of the generator, causing the same to provide an electric current flow through electromagnet winding 42. Armature member 44 is thus held magnetically in its attracted position, wherefore on subsequent release of the reset stem 80 the valve members 24 and 66 are retained in their flow-permitting positions.

The next step in the operation of the subject device is to rotate the operating handle 82 to its "on" position, thereby effecting registration of port 30a and inlet chamber 12 and permitting fluid fuel to flow to the main burner from chamber 12 through port 30a, intermediate chamber 15, outlet chamber 14 and conduit 16. The fluid fuel thus emitted from the main burner is ignited by the flame of the pilot burner, thereby placing the fuel burning apparatus in operation.

Extinguishment of the pilot burner flame during operation of the fuel burning apparatus causes the thermoelectric generator to be cooled by the surrounding atmosphere, whereupon electromagnet winding 42 is de-energized, permitting compression spring 52 to return valve stem 46 to its initial position. Such movement of valve stem 46 returns valve member 24 to seating engagement with valve seat 22 and permits compression spring 72 to return valve member 66 to seating engagement with valve seat 68. The fuel flow to both the main and pilot burners is thereby terminated.

If a condition should arise wherein the pilot and main burners are lit and it is desired to shut down the fuel burning apparatus, it is merely necessary to turn thumb screw 74 inwardly sufficiently to engage the pilot valve member 66 and move the latter inwardly far enough so that the resultant clockwise movement of the lever 76 pulls the armature member 44 free of the magnet frame 40. This, of course, permits compression spring 52 to return valve member 24 to its flow-preventing position and also permits the spring 72 to return the valve member 66 to seated position, thereby terminating fuel flow to both the main and pilot burners as aforementioned.

Figure 2:
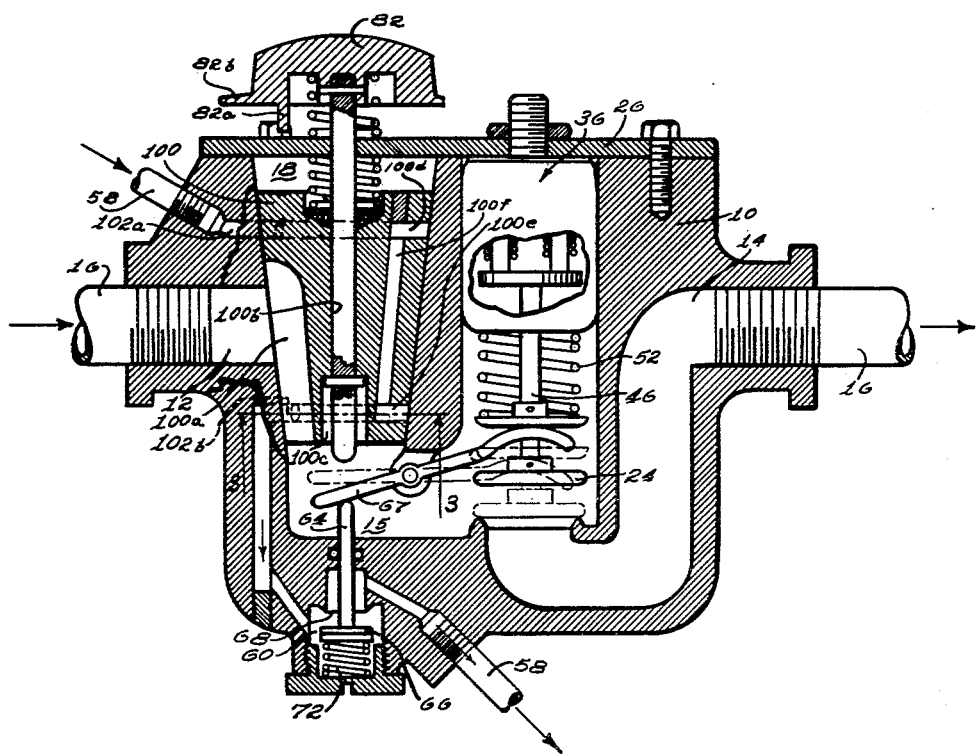
Figure 2 is a fragmentary sectional view of the second embodiment of the present invention.

Referring to the second embodiment shown in Figure 2, all of the parts except the plug valve and the pilot fuel inlet passage leading to pilot valve chamber 60 are identical with those parts shown in Figure 1.

The embodiment of Figure 2 has a plug valve 100 formed with a port 100a identical with port 30a of plug valve 30 (Figure 1) and a through opening 100b and slot 100c identical with the corresponding openings shown in Figure 1. In addition to such openings, plug valve 100 is also formed with arcuately shaped peripheral slots 100d and 100e for registration, respectively, with ports 102a and 102b formed in valve body 102 and opening into the cavity 18. Communication between arcuate slots 100d and 100e is provided by an opening 100f in the plug 100, wherefore registration of slot 100d with opening 102a and registration of slot 100e with opening 102b, permits pilot burner fuel to flow through opening 102a, slot 100d, opening 100f, slot 100e and opening 102b to pilot valve chamber 60. The slots 100d and 100e are so positioned that they afford the aforementioned communication when the lug 82a of the plug valve member 100 is in registry with an aperture (not shown in Figure 2) formed in cover plate 26, i.e. in "pilot" position. In this position of plug valve, port 100a is out of registration with main inlet chamber 12 to prevent fuel flow to the main burner through the intermediate chamber 15 during ignition of the pilot burner.

Figure 3:
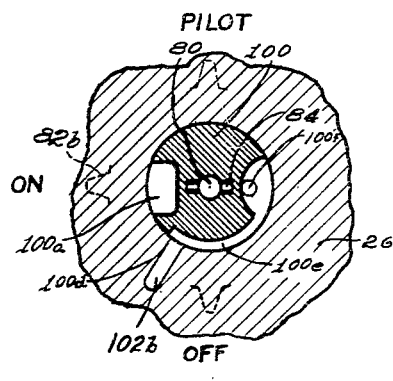
Figure 3 is a sectional view of the plug valve member 100 taken substantially along line 3—3 of Figure 2, parts of the valve body being broken away to show portions of the plug valve member in bottom plan.

In Figures 2 and 3, the plug valve member 100 is shown in its "on" position and, as shown in Figure 3, slots 100d and 100e extend for an arcuate distance sufficient to maintain pilot fuel flow in the "on" position as well as during movement of plug valve 100 from its "pilot" position to its "on" position. Of course, in the "off" position of the plug valve member, the slots 100d and 100e are out of registry with the ports 102a and 102b, and the port 100a is out of registry with the inlet chamber 12 to prevent any fuel flow to the main or pilot burners.

The operation of the embodiment of Figure 2 is substantially identical with that of the first embodiment except that with pilot fuel flow under control of plug valve 100, valve members 24 and 66 can be returned to their flow-preventing positions merely by rotating operating handle 82 to its "off" position to terminate pilot fuel flow and thereby effect deenergization and release of the electromagnetic holding device 36. The thumb screw 74 of Figure 1 has been eliminated in the second embodiment, since its operational function is thus afforded by plug valve 100.

Figure 3 of the drawings shows the construction of plug valve 100, and more particularly, shows the relationship between indicator 82b of handle 82 and the various operational functions of said plug valve 100. That is, cover plate 26 may be marked with the various indicia shown, namely "on," "off" and "pilot" so that alignment of said indicator 82b with the particular indicia will afford the function desired.

Although I have shown and described certain specific embodiments of my invention, I am fully aware that many modifications thereof are possible. My invention therefore is not to be restricted except insofar as is necessitated by the prior art and by the spirit of the appended claims.

I claim:

1. A fluid flow control device comprising, in combination, a valve body formed with separated and independent first and second fluid passages, rotatable valve means in said first and second fluid passages having flow-permitting and flow-preventing positions for each of said passages for control of fluid flow therethrough and also having a reset position permitting fluid flow through one of said passages and preventing fluid flow through the other of said passages, a separate valve member in each of said first and second fluid passages disposed downstream of said rotatable valve means and having flow-permitting and biased toward flow-preventing positions for respectively controlling fluid flow through said passages, holding means for holding one of said valve members in its flow-permitting position when moved thereto, pivotal lever means interconnecting said valve members to position the other of said valve members in its flow-permitting position whenever said one valve member is in its flow-permitting position, valve operating means having a portion coacting with said lever means and reciprocatably movable to pivot said lever means and to effect movement of said valve members to their said flow-permitting positions, said valve operating means also being rotatable to afford rotation of said rotatable valve means independent of said valve members, and means preventing reciprocating movement of said operating means except when said rotatable valve means is in said reset position.

2. A fluid flow control device comprising, in combination, a valve body formed with independent and separated first and second fluid passages each having an inlet and outlet, rotatable valve means in said first fluid passage for control of fluid flow through at least the outlet of said first passage, a separate valve member in each of said first and second fluid passages having open and biased toward closed positions for respectively controlling fluid flow through the outlets thereof, said valve member in said first fluid passage being intermediate the outlet of said first passage and said rotatable valve means electromagnetic holding means operatively associated with one of said valve members for directly holding the latter against its bias in open position when moved thereto, means interconnecting said valve members to position the other of said valve members in its open position against its bias whenever said one valve member is in its open position, operating means for said valve means and valve members having a first portion engageable with said interconnecting means to effect movement of said valve members to their said open positions and a second portion having engagement with said rotatable valve means for rotation thereof independent of movement of said valve members, and means preventing the first portion of said operating means from effecting movement of said valve members except when said valve means is positioned to prevent fluid flow through said first fluid passage.

3. A fluid flow control device comprising, in combination, a valve body formed with separate and independent first and second fluid passages, rotatable valve means in said first fluid passage for control of fluid flow therethrough, a separate valve member in each of said first and second fluid passages each biased toward one and movable to another flow controlling position for respectively controlling fluid flow through said passages, electromagnetic holding means operatively related to one of said valve members for directly holding said one valve member in its said another flow controlling position when moved thereto, means interconnecting said valve members to position the other of said valve members in its said another flow controlling position whenever said one valve member is in its said another flow controlling position, and operating means for said valve means and valve members having a first portion engageable with said interconnecting means to effect movement of said valve members to their said another flow controlling positions and a second portion having an engagement with said rotatable valve means for rotation thereof independent of movement of said valve members.

4. A fluid flow control device comprising, in combination, a valve body formed with separate and independent first and second fluid passages, rotatable valve means in said first fluid passage for control of fluid flow therethrough, a separate valve member in each of said first and second fluid passages each biased toward one and movable to another flow controlling position for respectively controlling fluid flow through said passages, electromagnetic holding means operatively related to one of said valve members for directly holding said one valve member in its said another flow controlling position when moved thereto, means inter-connecting said valve members to position the other of said valve members in its said another flow controlling position whenever said one valve member is in its said another flow controlling position, operating means for said valve means and valve members having a first portion engageable with said interconnecting means to effect movement of said valve members to their said another flow controlling positions and a second portion having an engagement with said rotatable valve means for rotation thereof independent of movement of said valve members, and means for selectively releasing said holding means for return of said valve members to their said one flow controlling position.

5. A fluid flow control device comprising, in combination, a valve body formed with separate and independent first and second fluid passages, rotatable valve means in said first fluid passage for control of fluid flow therethrough, a separate valve member in each of said first and second fluid passages each biased toward one and movable to another flow controlling position for respectively controlling fluid flow through said passages, electromagnetic holding means operatively related to one of said valve members for directly holding said one valve member in its said another flow controlling position when moved thereto, means inter-connecting said valve members to position the other of said valve members in its said another flow controlling position whenever said one valve member is in its said another flow controlling position, operating means for said valve means and valve members having a first portion engageable with said inter-connecting means to effect movement of said valve members to their said another flow controlling positions and a second portion having an engagement with said rotatable valve means for rotation thereof independent of movement of said valve members, means for selectively releasing said holding means for return of said valve members to their said one flow controlling position, and means for preventing the first portion of said operating means from effecting movement of said valve members except when said rotatable valve means is positioned to prevent fluid flow through said first fluid passage.

6. A fluid flow control device comprising, in combination, a valve body formed with separate and independent first and second fluid passages, rotatable valve means in said first fluid passage for control of fluid flow therethrough, a separate valve member in each of said first and second fluid passages each biased toward flow permitting and movable to flow preventing position for respectively controlling fluid flow through said passages, electromagnetic holding means operatively related to one of said valve members for directly holding said one valve member in its flow permitting position when moved thereto, an elongated pivotally mounted lever operatively associated with said valve members to move the other of said valve members to its flow permitting position whenever said one valve member is moved to its flow permitting position, operating means for said valve means and valve members having a first portion engageable with said lever to effect movement of said valve members to their flow permitting positions and a second portion having engagement with said rotatable valve means for rotation thereof independent of movement of said valve members.

7. A fluid flow control device comprising, in combination, a valve body formed with separate and independent first and second fluid passages, rotatable valve means in said first fluid passage for control of fluid flow therethrough, a separate valve member in each of said first and second fluid passages each biased toward flow permitting and movable to flow preventing position for respectively controlling fluid flow through said passages, electromagnetic holding means operatively related to one of said valve members for directly holding said one valve member in its flow permitting position when moved thereto, and elongated pivotally mounted lever operatively associated with said valve members to move the other of said valve members to its flow permitting position whenever said one valve member is moved to its flow permitting position, operating means for said valve means and valve members having a first portion engageable with said lever to effect movement of said valve members to their flow permitting positions and a second portion having engagement with said rotatable valve means for rotation thereof independent of movement of said valve members, and means associated with said valve members for selectively releasing said holding means for return of said valve members to their flow preventing positions.

8. A fluid flow control device comprising, in combination, a valve body formed with separate and independent first and second fluid passages, rotatable valve means in said first fluid passage for control of fluid flow therethrough, a separate valve member in each of said first and second fluid passages each biased toward flow permitting and movable to flow preventing position for respectively controlling fluid flow through said passages, electromagnetic holding means operatively related to one of said valve members for directly holding said one valve member in its flow permitting position when moved thereto, an elongated pivotally mounted lever operatively associated with said valve members to move the other of said valve members to its flow permitting position whenever said one valve member is moved to its flow permitting position, operating means for said valve means and valve members having a first portion engageable with said lever to effect movement of said valve members to their flow permitting positions and a second portion having engagement with said rotatable valve means for rotation thereof independent of movement of said valve members, and means preventing the first portion of said operating means from effecting movement of said valve members except when said valve means is positioned to prevent fluid flow through said first fluid passage.

References Cited in the file of this patent

UNITED STATES PATENTS

| | | |
|---|---|---|
| 2,318,823 | Wantz | May 11, 1943 |
| 2,588,179 | Thornbery | Mar. 4, 1952 |
| 2,591,897 | Weber | Apr. 8, 1952 |
| 2,719,531 | Sogge | Oct. 4, 1955 |